April 28, 1959  F. H. KARSTEN ET AL  2,883,863
ARRANGEMENT FOR GYRO-STABILIZED PLATFORM
Filed Nov. 22, 1957  3 Sheets-Sheet 1

INVENTOR.
Fred Karsten
BY James E. Hill

Attys.

April 28, 1959   F. H. KARSTEN ET AL   2,883,863
ARRANGEMENT FOR GYRO-STABILIZED PLATFORM
Filed Nov. 22, 1957   3 Sheets-Sheet 2

INVENTOR.
Fred Karstens
James E. Hill
BY
Attys.

United States Patent Office 2,883,863
Patented Apr. 28, 1959

2,883,863

ARRANGEMENT FOR GYRO-STABILIZED PLATFORM

Fred H. Karsten, Chicago, and James E. Hill, Oak Lawn, Ill., assignors to Chicago Aerial Industries, Inc., Melrose Park, Ill., a corporation of Illinois Application November 22, 1957, Serial No. 698,182

14 Claims. (Cl. 74—5.22)

The present invention relates to gyro-stabilized platforms and particularly to an arrangement useful for stabilizing a platform in a moving vehicle.

In position locating operations such as navigating, surveying and mapping where precision equipment is utilized, it is necessary to provide for the equipment a mounting platform which can be stabilized to a reference frame. For example, in aerial reconnaissance and mapping operations it is necessary that the camera and its mounting platform be maintained substantially fixed on the photographic target during the period of exposure in order to provide an acceptable degree of photographic resolution. However, the operation of the camera itself in transporting the film, cocking the shutter, releasing the shutter, etc., introduces unbalances which sometimes can result in deflection of the camera from the target beyond a degree of movement permissive for good photographic resolution. For the usual aerial photographic operation, it is not economically feasible to provide stabilizing equipment which will compensate for every movement of the camera with regards to the target being photographed, but it has been found that if angular movements of the camera are limited to not more than thirty seconds of a degree of arc with reference to the photographic axis in some circumstances and not more than five seconds in other circumstances, aerial photographs of an acceptable resolution can be attained.

It is an object of the present invention to provide an improved platform stabilizing arrangement which will limit the angular movement of the platform to not more than five seconds of arc during a photographic exposure.

Another object of the invention is to provide a platform arrangement including gyroscopic apparatus of great sensitivity and a stabilization system operative therefrom for maintaining the platform in its normal reference position.

An additional object of the invention is to provide a platform stabilization arrangement including gyroscopic apparatus having a moment of inertia of such magnitude and orientation as to prevent transient movement of the platform from a reference position and wherein the gyroscopic apparatus is precessed in accordance with unbalances impressed on the platform for causing counteracting and neutralizing torques to be generated and applied to the platform.

A further object of the invention is to provide an improved gyro-controlled platform arrangement including a stabilization system having a torsion spring driven in accordance with disturbing torques impressed on the platform for counteracting and neutralizing the disturbing torques.

A further object of the invention is to provide an improved platform arrangement including gyroscopic apparatus which is precessed in accordance with impressed torques tending to move the platform from its normal position and a stabilization system provided with a reversible drive motor and a torsion spring coupler which are driven in accordance with the direction of precession of the gyroscopic apparatus for quickly counteracting the torques impressed on the platform and thereby preventing movement of the platform from its normal position.

Another object of the invention is to provide an improved platform arrangement including gyroscopic apparatus precessed in accordance with impressed torques tending to displace the platform for controlling a platform stabilization system and a platform erection system responsive to movements of the platform from its normal position for applying torques to the gyroscope, thereby to generate forces of precession tending to restore the platform to its normal position.

Further objects and features of the invention pertain to the particular structures and arrangement whereby the above identified objects of the invention are attained.

The invention, both as to its structure and mode of operation, will be better understood by reference to the following disclosure and drawings forming a part thereof, wherein.

Figure 1:
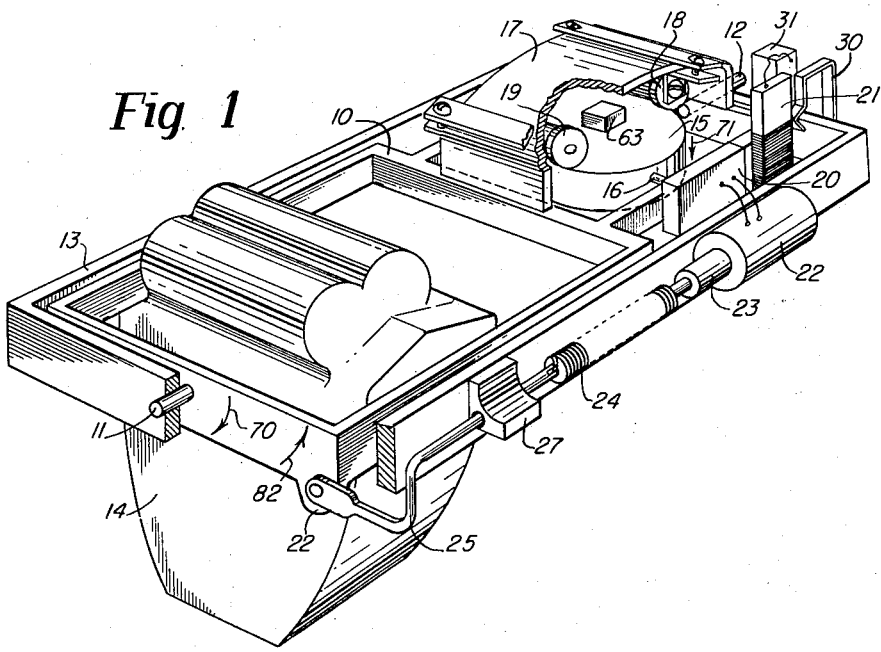
Figure 1 is a perspective view of the gyro-stabilized platform arrangement in accordance with the invention.

Referring to the drawings, there is shown in Figure 1 a platform frame 10 supported in an outer frame 13 along an axis on gimbal bearings 11 and 12. In an aircraft, the outer frame 13 would be a part of, or at least fixed to, the aircraft and the gimbal bearings 11 and 12 would preferably lie in the roll axis of the aircraft. The platform 10 carries thereon an aerial camera 14 rigidly mounted thereto and a gyroscopic apparatus 15 supported in the platform 10 by means of a pivot axis 16 lying in the plane of the platform at right angles to the axis of the bearings 11 and 12. Also supported on the frame and extending over the gyroscopic apparatus 15, is a cover plate 17 carrying a pair of electro-magnets 18 and 19 above and respectively fore and aft of the gyroscopic apparatus 15. In addition, the platform 10 carries thereon a control box 20 including the control circuit shown in Figure 2 and carries a switch plate 21 employed as is described in detail hereinafter.

The outer frame 13 carries thereon a reversible motor 22, a gear box 23 connected to the motor 22, a torsion spring 24 driven from the gear box 23 and a crank lever 25 pivotally connected to one moment arm of the platform 10 at a projection 26 and connected to the torsion spring 24 through a journal box 27. In addition, the outer frame 13 carries thereon the contact 30 associated with the switch plate 21 and a control box 31 including the circuitry shown in Fig. 4 for erecting the platform 10.

The gyroscopic apparatus 15 is of conventional structure including the normal caging equipment, and is mounted with its plane of spin substantially in the plane of the platform 10. The characteristics of the gyroscope are determined in accordance with the weight carried on the platform 10 and the unbalances experienced on the platform so that under normal operating conditions the rotational inertia of the gyroscope is sufficient to oppose any rotational movement of the platform. In response to any torque disturbances on the platform tending to cause its rotation, the gyroscope resists such movement and is instead precessed in a direction and to a degree dependent upon the direction and magnitude of the disturbing torque.

Figure 2:
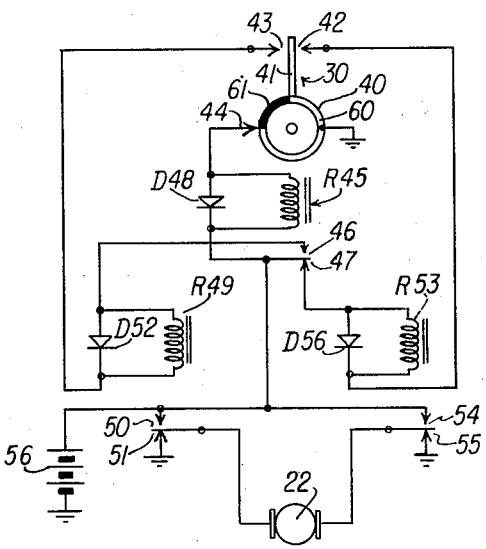
Figure 2 is a schematic representation of the circuit for controlling the stabilization system in the platform arrangement.

Referring to the circuitry included in the control box 20, there is shown in Figure 2 a circuit including a zero velocity switch 30 provided with commutator 40, a conductive finger 41, a pair of movable contacts 42 and 43 and a brush contact 44. In addition, the circuit includes a transfer relay R45, a diode D48, a first control relay R49, a diode D52, a second control relay R53, a diode D56 and an electrical energy source here represented as a battery 56.

Figure 3:
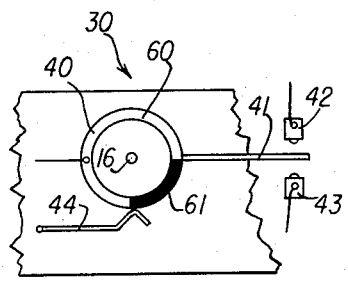
Figure 3 shows in detail the switch arrangement employed in the circuit of Figure 2.

With regards to the zero velocity switch 30, as shown in Figure 3, the commutator 40 thereof is substantially disc-like including a circumferential conductive segment 60, another smaller circumferential non-conductive segment 61 and a conductive finger 41 extending from the conductive segment 60. The commutator 40 is mounted at its center to the platform 10 for rotation about the axis of precession 16. The conductive brush 44 is rigidly supported on the platform 10 and the contacts 42 and 43, spaced on either side of the finger 41 are rigidly attached to the casing of the gyroscopic apparatus 15 for faithfully following all precessional movements of that apparatus. In the arrangement shown, should the gyroscopic apparatus 15 be precessed in a direction to cause the contact 42 to complete a circuit with the finger 41, the commutator 40 will be rotated by such contact to move the non-conductive segment 61 into contact with the brush 44. Similarly, should the gyroscopic apparatus 15 be precessed so as to cause the contact 43 to move against the finger 41, the commutator 40 will be rotated to move the conductive segment 60 thereof into contact with the brush 44. The manner in which the switch 30 and the circuitry of Figure 2 is employed for controlling stabilization of the platform is described in detail hereinafter.

Figure 4:
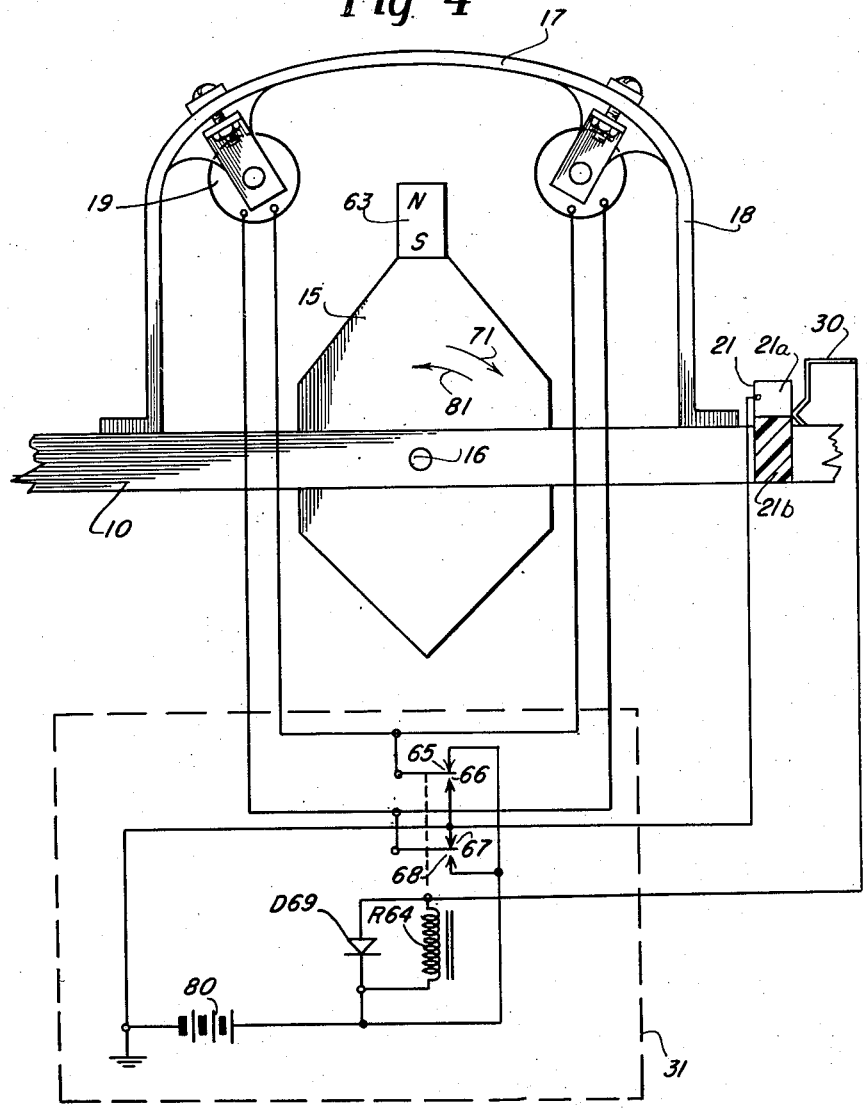
Figure 4 is a schematic representation of the circuit for controlling the platform erection system employed in the platform arrangement of Figure 1.

The erection system for the platform 10 includes, as shown in Figure 4, the gyroscopic apparatus 15, the electro-magnets 18 and 19, the contact plate 21 provided with a conductive portion 21a and a non-conductive portion 21b, the brush 30 and the control circuit box 31. The gyrocopic apparatus 15 has mounted at its top center a permanent magnet 63 which is attracted and repelled responsive to magnetic fields generated by the electromagnets 18 and 19. The control circuit of box 31 includes a control relay R64, a diode D69 and an electrical energy source here represented as a battery 80. Operation of the erection system for the platform 10 is explained hereinafter in relation to the operation of the arrangement for stabilizing the camera supporting platform 10.

Assuming that the gyroscope has been uncaged and set to spinning in the plane of the frame 13, operation of the camera 14 in transporting film and in moving the shutter creates unbalances which with other forces that may appear on the platform introduce torques tending to rotate the camera and the platform 10 about the axis of bearings 11 and 12. Torques impressed on the platform 10 cause the gyroscope 15 to precess from its normal or erect position about the axis 16 in a direction corresponding to the direction of the torque about the axis of the bearings 11 and 12. Assuming that an impressed torque is such that the platform 10 tends to rotate in a clockwise direction as indicated by the arrow 70, the gyroscopic apparatus 15 will be precessed in a direction depending upon its direction of spin and in a direction here assumed to be that indicated by the arrow 71. It is understood that the gyroscope will precess under the influence of the torque disturbances whether or not the platform actually moves. This precession of the gyroscopic apparatus 15 moves the contact 42 towards the finger 41 of the commutator 40 and if continued completes contact with the finger and rotates the commutator in a clockwise direction so that the brush 44 makes contact with the insulating segment 61 thereof. In this instance and as noted from Figure 2, a circuit is completed from ground potential through the conductive segment 60 of the commutator 40, the finger 41, contact 42, the winding of relay R53 and contact 47 to battery potential, whereby the relay R53 is energized to close its contacts 54. In this circumstance current is caused to flow from battery potential through the contact 54, the winding of the motor 22, contact 51 to ground potential, for operating the motor and applying a torque to the torsion spring 24. A portion of the torque so applied is stored in the spring and the remainder is transmitted there through to the crank lever 25 and applied to the platform 10 as a torque in the counter-clockwise direction opposed to the impressed torque so as to stabilize the platform in its normal position and cause precession of the gyroscopic apparatus 15 to be reversed.

Considering for a moment the characteristics of the torsion spring 24, since the disturbing torques on the platform 10 are counteracted and balanced by the torques developed in the spring, the spring constant must be sufficiently high to permit transmission of energies for overcoming the disturbing torques but not so high as to "fix" the platform to the outer frame 13 and deny the platform any freedom of movement relative to the outer frame 13. The actual spring constant chosen for any given stabilization system is dependent upon the inertia of the platform, the magnitude of the disturbing torques and the torque provided by the motor. Inherently, a small time interval will elapse between the occurrence of and the neutralization of a disturbing torque. During this time interval, the gyroscope stabilizes the platform by opposing the unbalance.

Returning again to the operation of the stabilization system and assuming that the reversible motor 22 has been energized and that a counteracting torque has been built up in the torsion spring 24, the energy is relayed via the lever crank 25 to the platform 10 causing a torque to be applied to the platform in the direction 82 counter to the direction 70. Precession of the gyroscope reverses to the direction 81 so that the circuit completed at contact 42 is interrupted and the relay R53 is restored causing the operating circuit for the motor 22 to be opened at the contacts 54. As the torque stored in the torsion spring 24 will normally build up a counteracting torque exceeding the disturbing torque, this precession of the gyroscope in the reverse direction 81 continues beyond its normal or erect position until finally the contact 43 engages and rides the conductive finger 41 causing the commutator 40 to be moved past the brush 44 until the conductive segment 60 is in contact therewith.

At this time then, a circuit is completed from ground potential via the conductive segment 60, the brush 44 and the winding of the relay R45 to battery potential whereby the relay R45 is operated and contacts 46 thereof are closed. Thereupon, a circuit is completed from ground potential via the conductive segment 60, the conductive finger 41, contacts 43, the winding of the relay R49 and the contacts 46 to battery potential whereby the relay R49 is energized and the contacts 40 thereof are closed. At this time then, a circuit for causing reverse operation of the motor 22 is completed from ground potential via the contacts 55, the motor 22 and contacts 50 to battery potential. The action of the motor creates a counter torque which initially reduces the residual torque stored in the torsion spring 24 and if continued, builds up a reverse torque in the torsion spring. In actual practice the zero velocity switch 30 is arranged so that it will in each instance energize the motor circuit until a slight excess of counteracting torque is impressed on the platform 10 causing precession of the gyroscope to reverse and the switch to be operated for completing the reverse motor circuit. Thus, the gyroscope continues to cycle in a narrow region associated with its normal position and the motor 22 is reversibly driven in accordance with precession of the gyroscope until a new disturbing torque is experienced on the platform.

Regardless of the nature of the torque disturbances, the stabilization system will operate as described. However, in instances where the torque disturbances are gradually impressed over a long time period and the reference frame is allowed to rotate such as in a coordinated turn, the spin plane of the gyroscope and the platform itself may be displaced from their original attitude so that the gyroscope will actually tend to stabilize the platform in a new plane different from the plane of the frame 13. In order to prevent such occurrences, it is necessary to erect the platform from any rotated position to the original reference position in the plane of the frame 13.

Assuming that the platform 10 is rotated in the direction 70, a circuit is completed at the contact plate 21 and the brush arm 30 for erecting the platform. Specifically, a circuit is completed from ground potential through the conductive portion 21a of the contact plate 21, the brush arm 30 and the winding of the erection relay R64 to battery potential, whereupon the relay R64 is operated and the contacts 66 and 68 thereof are closed. The electromagnets 18 and 19 in the erection circuit are connected in push-pull relationship so that responsive to the closing of the contacts 66 and 68 a circuit is completed from ground potential through the windings of the electro-magnets to battery potential, whereby a magnetic field is generated for effecting the permanent magnet 53 to apply to the gyroscope apparatus 15 a generated torque in a direction indicated by the arrow 71. The generated torque in the direction 71 causes the gyroscope to precess in the direction 82 and apply to the platform 10 a rotational force tending to erect the platform in the plane of frame 13. When the platform 10 is finally erected through action of the electro-magnets 18 and 19 and the permanent magnet 53 on the gyroscope 15, the non-conductive portion 21b of the switch plate is engaged by brush 30 so that the previously completed circuit is interrupted and the relay R69 restored. Accordingly, contacts 66 and 68 are opened and contacts 65 and 67 are closed completing a circuit for energizing the electro-magnets 18 and 19 in the reverse direction whereby a torque is applied to the gyroscope 15 tending to precess the gyroscope and rotate the platform in the opposite direction 70 until the erection circuit is again completed at the conductive position 21a of the switch plate 21 and the brush 30. Thus the electro-magnets 18 and 19 are cycled to cause the platform 10 to be cycled through a very small angle about the plane of the frame 13.

In view of the foregoing explanation of the operation of the stabilized platform arrangement, it is obvious that through the action of the erection circuit including the electro-magnets 18 and 19, the platform itself is cycled through a very small angle proximate to the plane of the frame 13. Cycling occurs at a rate in the order of two degrees per minute of time. At the same time and even in the absence of a disturbing torque the gyroscopic apparatus 15 is precessed by action of the commutator switch 40, the motor 22 and the torsion spring 24 in a cycle through a very small angle proximate to its normal position at a rate in the range between 5 and 150 cycles per second. This continuous cycling is interrupted only by the occurrence of a disturbing torque on the platform 10. Thereupon, the gyroscopic apparatus 15 is precessed beyond the norm of the cycle and causes the motor 22 to operate in the manner explained for providing a counteracting torque. When the disturbing torque has been counteracted, the system will again continue its normal cycling operation. Should the disturbing torque be dissipated before a counteracting torque is applied by the motor 22 and the torsion spring 24, the gyroscope 15 will precess just as though the counteracting torque had been applied and the control devices will operate as described.

The diodes D48, D52, and D56 provided in the motor control circuit and the diode D69 provided in the erection circuit are included for purposes of suppressing any arcs which might be developed at the several contacts thereby protecting the contacts of the relays and of the zero velocity switch. The torsion spring employed in the stabilization arrangement may be a helical spring such as that illustrated in Fig. 1, but it may also be torsion bar such as illustrated in Fig. 5, or any other type of torsion arrangement which is susceptible to reversible energy storage action.

While the invention has been described in terms of stabilization effective along the roll axis of the aircraft in which the platform is mounted, it is understood that the axis of stabilization can be made to coincide with the pitch axis or with the yaw axis of the aircraft or with all three of these axes. There is shown in Figure 5 a schematic representation of a camera platform 90 carried on a bearing 91 and a bearing 92 (not shown) in a vertical gimbal frame 93 for rotation about the pitch axis, wherein the vertical gimbal frame 93 is carried by bearings 94 and 95 within a vertical gimbal frame 96 for rotation about the yaw axis, and wherein the vertical gimbal frame 96 is carried by bearings 97 and 98 within a fixed frame 99 for rotation about the roll axis. The camera platform 90 carries thereon a gyroscopic apparatus 101 mounted to precess in response to torque disturbances about the roll axis of the aircraft, a gyroscopic apparatus 102 mounted to precess in response to torque disturbances about the yaw axis of the aircraft and a gyroscopic apparatus 103 pivotally mounted to precess in response to torque disturbances about the pitch axis of the aircraft.

In addition, the system includes a roll axis stabilization system 104 including a motor 105 mounted to the fixed frame 99, a torsion spring 106 and a lever crank 107 connected between the torsion spring 106 and the vertical gimbal frame 96. Carried on the vertical gimbal frame 96 is a yaw axis stabilization system 108 including a motor 109, a torsion spring 110 and a lever crank 111 connected between the torsion spring 110 and the vertical gimbal 93. Mounted on the vertical gimbal 93 is the pitch axis stabilization arrangement 115 including the reversible motor 116, a torsion spring 117 connected thereto and a crank lever 118 connected between the torsion spring 117 and the platform 90. The equipment presented schematically therein including the gyroscopic apparatus and the stabilization arrangements are identical to the similar equipment provided in the arrangement of Figure 1. In this arrangement the gyroscopic apparatus 101, 102, and 103 are associated respectively with the stabilization apparatus 104, 108 and 115, each through a control circuit such as that shown in Figure 2 but not included for the sake of simplicity in the schematic representation of Figure 5. In this arrangement, the camera could be held substantially fixed on a target irrespective of any roll, pitch or yawing actions to which the aircraft might be subjected by air turbulence, for example.

Figure 5:
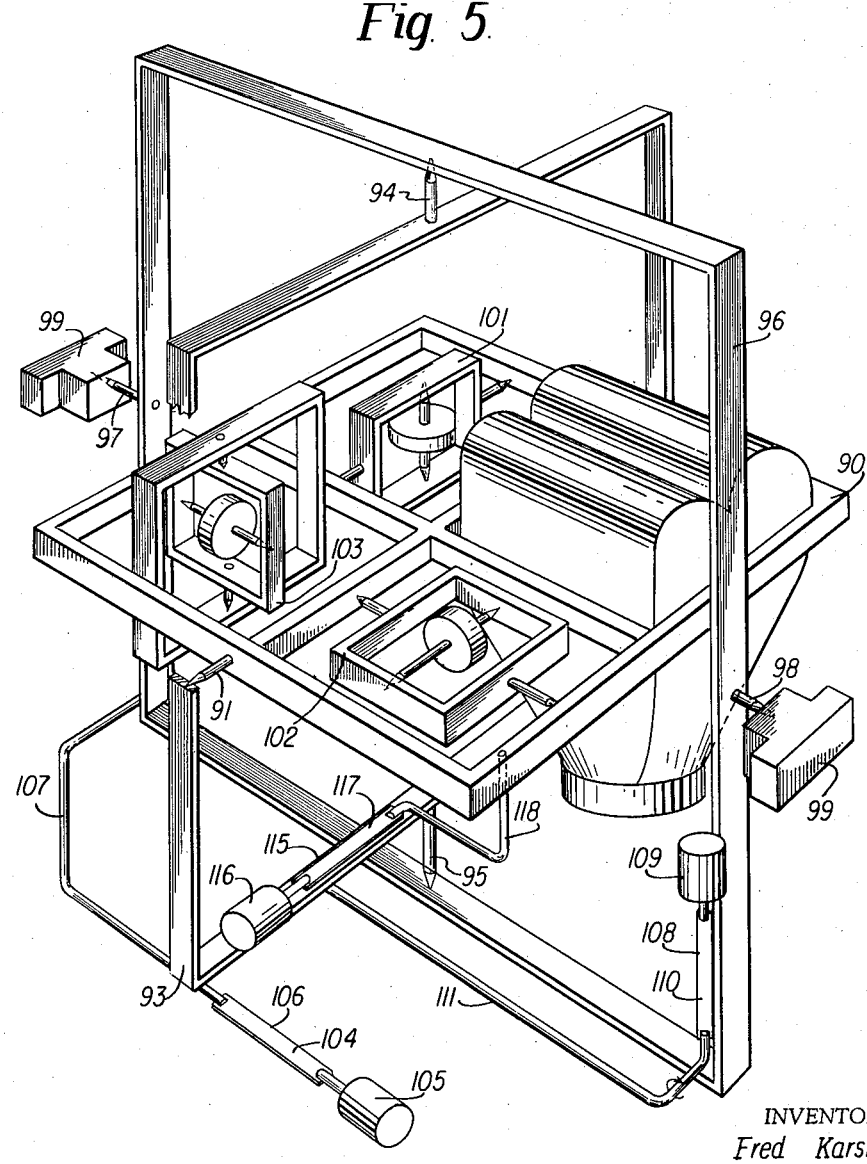
Figure 5 is a schematic representation in perspective of a gyro-stabilized platform arrangement in accordance with the invention which is stabilized about three different axes of a reference frame.

In the arrangement of Figure 5 the gyroscopic apparatus and the torque stabilization arrangements are capable of counteracting any disturbing torques developed around any of the three axes of the gimbal frames in the same manner as explained above with reference to the arrangement of Figure 1. Each of the gimbal frames included in the arrangement of Figure 5 may be provided with the erection means such as illustrated in Figures 1 and 4 for preventing movements of the gimbal frames from their reference positions.

In view of the foregoing disclosure, it is evident that there has been provided an improved stabilization system for an aerial camera platform, or a platform of the like, which in one application is adapted for maintaining the platform stabilized with regards to a reference plane determined by the gyroscopic apparatus and to cycle the platform through limited movements with regards to that reference frame and in another application is adapted to maintain the platform stabilized with respect to the structure in which it is mounted and to cycle the platform through limited movements with regards to the structure.

While the embodiment described herein is at present considered to be preferred, it is understood that variations and modifications may be made therein, and it is intended to cover in the appended claims all such variation and modifications as fall within the true spirit and scope of the invention.

What is claimed is:

1. A platform stabilization system comprising a platform supported along an axis for rotation within a frame, gyroscopic apparatus pivotally supported on said platform for precession in accordance with torques impressed on said platform tending to move said platform from a normal position about said axis, and platform stabilization means including a reversible drive motor and a series connected torsion spring coupling said frame to said platform driven in accordance with precession of said gyroscopic apparatus for counteracting said impressed torques.

2. A platform stabilization system comprising a platform supported along an axis for rotation within a frame, gyroscopic apparatus pivotally supported on said platform for precession in accordance with torques impressed on said platform tending to move said platform from a normal position about said axis, a reversible drive motor and a series connected torsion spring coupling said frame to said platform, and means responsive to the direction of precession of said gyroscopic apparatus for selectively driving said reversible drive motor to counteract said impressed torques.

3. A platform stabilization system comprising a platform supported along an axis for rotation within a frame, gyroscopic apparatus pivotally supported on said platform for precession in accordance with torques impressed on said platform tending to move said platform from a normal position about said axis, and platform stabilization means including a reversible motor driven in accordance with precession of said gyroscopic apparatus, a lever arm connected to said frame, and torsion spring coupling means between said motor and said lever arm for transmitting force from said motor to said arm for counteracting said impressed torque on said platform.

4. The stabilization system set forth in claim 3 wherein said torsion spring coupling means is a torsion bar.

5. The stabilization system set forth in claim 3 wherein said torsion spring coupling means is a helical torsion spring.

6. A platform stabilization system comprising a platform supported along axes for rotation within a frame, gyroscopic apparatus carried on said platform and precessed in accordance with torques impressed on said platform tending to move said platform from a normal position about said axes, and platform stabilization means including a plurality of reversible motors corresponding to said axes and extending between said frame and said platform and driven in accordance with precession of said gyroscopic apparatus for counteracting said impressed torques.

7. A platform stabilization system comprising a platform supported along an axis for rotation within a frame, gyroscopic apparatus pivotally supported on said platform for precession in accordance with torques impressed on said platform tending to rotate said platform from a normal position about said axis, a lever arm connected to said platform, a reversible motor mounted on said frame, torsion spring coupling means between said motor and said lever arm for transmitting force from said motor to said arm for counteracting torques impressed on said platform, a control circuit for said reversible motor operated into a first condition responsive to precession of said gyroscopic apparatus in one direction for driving said reversible motor in a direction and operated into a second condition responsive to the precession of said gyroscopic apparatus in the reverse direction for driving said reversible motor in the reverse direction.

8. A platform stabilization system comprising a platform supported along an axis for rotation within a frame, gyroscopic apparatus pivotally supported on said platform for precession in accordance with torques impressed on said platform tending to move said platform from a normal position about said axis, a lever arm connected to said platform, a reversible motor mounted on said frame, torsion spring coupling means between said motor and said lever arm for transmitting force from said motor to said arm for counteracting torques impressed on said platform, a first circuit completed responsive to the precession of said gyroscope in one direction from its normal position for driving said reversible motor in a direction, and a second circuit completed responsive to the precession of said gyroscope in the reverse direction from its normal position for driving said reversible motor in the reverse direction.

9. A platform stabilization system comprising a platform supported along an axis for rotation within a frame, gyroscopic apparatus pivotally supported on said platform for precession in accordance with torques impressed on said platform tending to move said platform from a normal position about said axis, a lever arm connected to said platform, a reversible motor mounted on said frame, torsion spring coupling means between said motor and said lever arm for transmitting force from said motor to said arm for counteracting torques impressed on said platform, a first circuit operative for driving said motor in one direction, a second circuit operative for driving said motor in the reverse direction, and a two position switch operative into a first position responsive to precession of said gyroscope in one direction from its normal position for completing said first circuit and operative into second position responsive to precession of said gyroscope in the reverse direction from its normal position for completing said second circuit.

10. A platform stabilization system comprising a platform supported along an axis for rotation within a frame, gyroscopic apparatus pivotally supported on said platform for precession in accordance with torques impressed on said platform tending to move said platform from a normal position about said axis, a lever arm connected to said platform, a reversible motor mounted on said frame, torsion spring coupling means between said motor and said lever arm for transmitting force from said motor to said arm for counteracting torques impressed on said platform, a first circuit provided with a control relay operative for driving said motor in one direction, a second circuit provided with a control relay operative for driving said motor in the reverse direction, a third circuit including a transfer relay normally preparing said first circuit for operation and operative for interrupting said first circuit and for preparing said second circuit for operation, a first contact and a spaced apart second contact movable with said gyroscopic apparatus and associated respectively with said first circuit and said second circuit, a commutator including a non-conductive segment and a conductive segment having a conductive finger extended between said first and second contacts and being mounted for rotation on said frame, and a contact brush for slidably engaging said conductive and non-conductive segments of said commutator and associated with said third circuit, said first circuit being completed responsive to said first contact and said brush engaging respectively said finger of said commutator and said non-conductive segment of said commutator, said second circuit being completed responsive to said second contact and said brush engaging respectively said finger of said commutator and said conductive segment of said commutator, whereby responsive to precession of said gyroscope in one direction from its normal position said motor is driven in one direction and whereby responsive to precession of said gyroscope in the reverse direction from its normal position said motor is driven in the reverse direction.

11. A platform stabilization system comprising a platform supported along an axis for rotation within a frame, gyroscopic apparatus pivotally supported on said platform for precession in accordance with torques impressed on said platform tending to move said platform from a normal position about said axis, means responsive to movement of said platform from said normal position for applying to said gyroscopic apparatus torques for precessing said gyroscope in a direction counter to said impressed torques for restoring said platform to said normal position, a reversible drive motor and a series connected torsion spring coupling said frame to said platform, and means responsive to the direction of precession of said gyroscopic apparatus for selectively driving said reversible drive motor to counteract said impressed torques.

12. A platform stabilization system comprising a platform supported along an axis for rotation within a frame, gyroscopic apparatus pivotally supported on said platform for precession in a direction and to a degree determined respectively by the direction and magnitude of torques impressed on said platform tending to rotate said platform about said axis from its normal position, electro-magnetic means associated with said gyroscopic apparatus and responsive to movement of said platform from said normal position for applying to said gyroscopic apparatus torques for precessing said gyroscope in a direction counter to said impressed torques for restoring said platform to said normal position, a reversible drive motor and a series connected torsion spring coupling said frame to said platform, and motor control means responsive jointly to a predetermined degree of precession of said gyroscopic apparatus from its normal position and to the direction of such precession for selectively driving said reversible drive motor and said torsion spring for counteracting said impressed torques, whereby responsive to any movement of said platform from said normal position said electro-magnetic means operate for restoring said platform to said normal position and responsive to predetermined precession of said gyroscope from its normal position said reversible drive motor cooperates with said electro-magnetic means for restoring said platform to normal.

13. A platform stabilization system comprising a platform supported along an axis for rotation within a frame, gyroscopic apparatus pivotally supported on said platform for precession in a direction and to a degree determined respectively by the direction and magnitude of torques impressed on platform tending to rotate said platform about said axis from its normal position, a permanent magnet mounted on said gyroscopic apparatus remote from the pivotal support thereof, electro-magnetic means mounted on said platform in proximity to said permanent magnet and energized in accordance with the directions of movement of said platform from said normal position for applying to said permanent magnet forces tending to precess said gyroscopic apparatus in a direction counter to said impressed torques for restoring said platform to normal, a reversible drive motor and a series connected torsion spring coupling said frame to said platform, and motor control means responsive jointly to a predetermined degree of precession of said gyroscopic apparatus from its normal position and to the direction of said precession for selectively driving said reversible drive motor and said torsion spring for counteracting said impressed torques, whereby responsive to any movement of said platform from said normal position said electromagnetic means operate for restoring said platform to normal and responsive to predetermined precession of said gyroscope from its normal position said reversible drive motor for neutralizing said impressed torques cooperates with said electromagnetic means for restoring said platform to normal.

14. A platform stabilization system comprising a platform supported along an axis for rotation within a frame, gyroscopic apparatus pivotally supported on said platform for precession in a direction and to a degree determined respectively by the direction and magnitude of torques impressed on said platform tending to move said platform about said axis from its normal position, a permanent magnet mounted on said gyroscopic apparatus remote from the pivotal support thereof, a first electro-magnet and a second electro-magnet mounted on said platform in the plane of precession of said gyroscopic apparatus in mutual proximity to said permanent magnet and connected in push-pull relationship, circuit means responsive to directions of movement of said platform from said normal position for energizing said electro-magnets to apply to said permanent magnet forces tending to precess said gyroscopic apparatus in a direction counter to said impressed torques for restoring said platform to normal, a reversible drive motor and a series connected torsion spring linking said frame to said platform, and motor control means responsive jointly to a predetermined degree of precession of said gyroscopic apparatus from its normal position and to the direction of such precession for selectively driving said reversible drive motor and said torsion spring for counteracting said impressed torques, whereby responsive to any movement of said platform from said normal position said electromagnetic means operates for restoring said platform to normal and responsive to predetermined precession of said gyroscope from its normal position said reversible drive motor cooperates with said electro-magnetic means for restoring said platform to normal.

References Cited in the file of this patent

UNITED STATES PATENTS

| | | |
|---|---|---|
| 1,573,343 | Holeka | Feb. 16, 1926 |
| 1,634,950 | Lucian | July 5, 1927 |
| 2,412,614 | Haskins | Dec. 17, 1946 |
| 2,570,653 | Dillard | Oct. 9, 1951 |
| 2,591,697 | Hays | Apr. 8, 1952 |
| 2,667,705 | Glenny | Feb. 2, 1954 |
| 2,771,779 | Schaffer | Nov. 27, 1956 |